(12) United States Patent  
An et al.

(10) Patent No.: US 9,355,106 B2  
(45) Date of Patent: May 31, 2016

(54) SENSOR DATA LOCATING

(71) Applicant: International Business Machines Corporation, Armonk, NY (US)

(72) Inventors: Wen Hao An, Beijing (CN); Ning Duan, Beijing (CN); Liya Fan, Beijing (CN); Bo Gao, Beijing (CN); Ke Hu, Beijing (CN); Wei Sun, Beijing (CN); Yu Ying Wang, Beijing (CN); Zhi Hu Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

(21) Appl. No.: 13/868,559

(22) Filed: Apr. 23, 2013

(65) Prior Publication Data

US 2013/0311480 A1    Nov. 21, 2013

(30) Foreign Application Priority Data

Apr. 27, 2012    (CN) .......................... 2012 1 0147248

(51) Int. Cl.  
*G06F 17/30*    (2006.01)

(52) U.S. Cl.  
CPC .... *G06F 17/30106* (2013.01); *G06F 17/30091* (2013.01)

(58) Field of Classification Search  
CPC ...................... G06F 17/30106; G06F 17/30091  
See application file for complete search history.

(56) References Cited

U.S. PATENT DOCUMENTS

| | | | | |
|---|---|---|---|---|
| 7,386,758 B2* | 6/2008 | Kitamura | ............ | G06F 11/1092 707/999.103 |
| 7,587,570 B2* | 9/2009 | Sarkar | .................. | G06F 3/0605 711/170 |
| 7,734,600 B1* | 6/2010 | Wise | .................... | G06F 21/6218 707/661 |
| 7,739,138 B2* | 6/2010 | Chauhan | ................ | G06Q 10/06 705/7.14 |
| 8,370,315 B1* | 2/2013 | Efstathopoulos | ... | G06F 17/3015 707/696 |
| 8,396,901 B2* | 3/2013 | Schnelle | ........... | G06F 17/30917 707/802 |
| 8,533,180 B2* | 9/2013 | Pschierer | ............... | G01C 21/00 707/717 |
| 9,015,426 B2* | 4/2015 | Stabrawa | ............ | G06F 3/80611 711/154 |
| 2003/0193478 A1 | 10/2003 | Ng | | |
| 2006/0085757 A1 | 4/2006 | Andre | | |
| 2007/0063984 A1 | 3/2007 | Chung | | |
| 2007/0118394 A1* | 5/2007 | Cahoon | .................. | G06Q 30/02 705/1.1 |

(Continued)

FOREIGN PATENT DOCUMENTS

EP    2381341    10/2011

OTHER PUBLICATIONS

Shvachko et al., "The Hadoop Distributed File System", IEEE, 2010, pp. 1-10.

(Continued)

*Primary Examiner* — Huawen Peng  
(74) *Attorney, Agent, or Firm* — Cantor Colburn LLP

(57) ABSTRACT

A method, an apparatus, and a system for locating sensor data. The method includes the steps of: obtaining an index table; intercepting a query for sensor data in runtime; extracting a characteristic parameter from a query condition; locating a block identifier of matching sensor data storage blocks in the index table by using the characteristic parameter; and loading the storage blocks into a memory space of a working processor; where the index table contains mapping relationships between block identifiers of sensor data storage blocks and characteristic attributes of sensor data.

17 Claims, 6 Drawing Sheets

(56) References Cited

U.S. PATENT DOCUMENTS

| | | | |
|---|---|---|---|
| 2008/0027788 A1* | 1/2008 | Lawrence | G06Q 30/02 705/7.33 |
| 2008/0042979 A1 | 2/2008 | Nikbin | |
| 2009/0055370 A1* | 2/2009 | Dagum | G06F 17/30194 |
| 2009/0237359 A1 | 9/2009 | Choi | |
| 2009/0259665 A1 | 10/2009 | Howe | |
| 2009/0299990 A1* | 12/2009 | Setlur et al. | 707/5 |
| 2010/0149103 A1 | 6/2010 | Betts Lacroix | |
| 2010/0333011 A1 | 12/2010 | Kornev | |
| 2011/0161294 A1* | 6/2011 | Vengerov | G06F 17/30581 707/637 |
| 2011/0191361 A1 | 8/2011 | Gupta | |
| 2011/0242137 A1 | 10/2011 | Kang | |
| 2011/0246826 A1 | 10/2011 | Hsieh | |
| 2011/0300912 A1 | 12/2011 | Cheon | |
| 2011/0313973 A1 | 12/2011 | Hadke | |
| 2012/0030018 A1 | 2/2012 | Achuthan | |
| 2012/0081312 A1 | 4/2012 | De Paz | |
| 2013/0225201 A1* | 8/2013 | Chen | G01S 5/02 455/456.2 |

OTHER PUBLICATIONS

Thusoo et al., "Data Warehousing and Analoytics Infrastructure at Facebook", SIGMOD '10, Jun. 6-10, 2010, pp. 1013-1020.

Anthony et al., Data Warehousing and Analytics Infrastructure at Facebook, SIGMOD Conference 2010, Jun. 6-10 2010, p. 1013-1020, Indianapolis USA.

Chansler et al., The Hadoop Distributed File System, Proceedings of the 2010 IEEE 26th Symposium on MSST, May 3-7 2010, p. 1-10, Sunnyvale California USA.

\* cited by examiner

SENSOR DATA LOCATING

CROSS-REFERENCE TO RELATED APPLICATION

This application claims priority under 35 U.S.C. §119 from China Patent Application No. 201210147248 filed Apr. 27, 2012 the entire contents of which are incorporated herein by reference.

BACKGROUND OF THE INVENTION

1. Field of the Invention

The present invention relates to the processing of sensor data, more particularly, to a sensor data locating method and apparatus.

2. Description of Related Art

In the smart planet scenario (e.g., Intelligent Operation Center (IOC) for city), there are thousands upon thousands of sensor devices distributed around city areas. The data generated by these sensor devices are gathered into a data center to support further intelligent analysis. The sensor data have the following characteristics: the sensor data are natively clustering together temporally and spatially in that, spatially, data of one sensor is the data of the area monitored by the sensor, and temporally, the sensor generates and stores the sensor data in the order of time; these sensor data are nearly all "written once, read many times"; these data files from thousands upon thousands of sensor devices will be gathered into a uniform big file, to facilitate management and global query.

Currently, Hadoop-like technologies (including Hadoop technology and other similar massive data distributed storage technologies) provide high availability and high throughput capacity to realize the storage and processing of massive data; however, the low latency, especially the low latency caused by low disk I/O bandwidth, is still a problem yet to be solved. Since the amount of sensor data is too large, they are usually stored in disks of data nodes distributed in various places in the form of blocks or chunks with certain redundancy. When a Hadoop-like based intelligent application performs a query, it will load all the data in the source file in the form of blocks from the disks of data nodes to the memory where the working processor resides. Then it is determined in the memory which data is related to the request, and which data is irrelevant to the current request, and the irrelevant data is discarded in the memory. Such an approach will make the disk I/O loads a large amount of invalid and irrelevant data into the memory, so as to bring extra disk I/O burden. Moreover, the larger the original file is, the greater the disk I/O burden is.

SUMMARY OF THE INVENTION

The present invention provides a method for locating sensor data, including the steps of: obtaining an index table; intercepting a query for sensor data in runtime; extracting a characteristic parameter from a query condition; locating a block identifier of matching sensor data storage blocks in the index table by using the characteristic parameter; and loading the storage blocks into a memory space of a working processor; where the index table contains mapping relationships between block identifiers of sensor data storage blocks and characteristic attributes of sensor data.

The present invention also provides an apparatus for locating sensor data, including: an index table obtaining module configured to obtain an index table; a query intercepting module configured to intercept a query for sensor data in runtime, and extract a characteristic parameter from a query condition; and a block locating module configured to locate a block identifier of matching sensor data storage blocks in the index table by using the characteristic parameter, and load the matching sensor data storage blocks into a memory space of a working processor; where the index table contains mapping relationships between block identifiers of sensor data storage blocks and characteristic attributes of sensor data.

The present invention further provides a system for locating sensor data, which includes: a memory; a processor device communicatively coupled to the memory; a sensor data locating module communicatively coupled to the memory and the processor device, where the sensor data locating module is configured to perform the steps of a method including: obtaining an index table; intercepting a query for sensor data in runtime; extracting a characteristic parameter from a query condition; locating a block identifier of matching sensor data storage blocks in the index table by using the characteristic parameter; and loading the storage blocks into the memory; where the index table contains mapping relationships between block identifiers of sensor data storage blocks and characteristic attributes of sensor data.

DETAILED DESCRIPTION OF THE PREFERRED EMBODIMENTS

The present invention reduces the waste of disk I/O bandwidth and working processor's memory space in a scenario involving the storage and processing of massive sensor data, improves query processing efficiency and reduces latency. Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for thorough and complete understanding of the present disclosure, and to completely convey the scope of the present disclosure to those skilled in the art.

Figure 1:
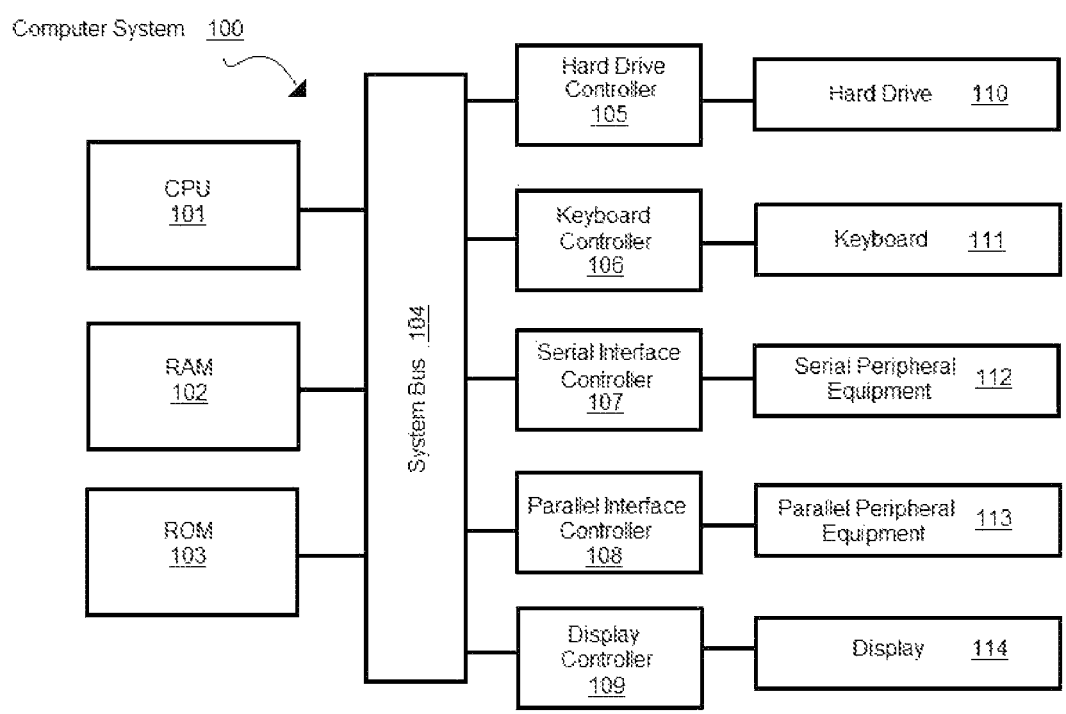
FIG. 1 shows a block diagram of an exemplary computer system 100 which is applicable to implement embodiments of the present invention.

Referring to FIG. 1, an exemplary computer system 100 which is applicable to implement the embodiments of the present invention is shown. In FIG. 1, the computer system 100 may include: CPU (Central Process Unit)101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN), a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
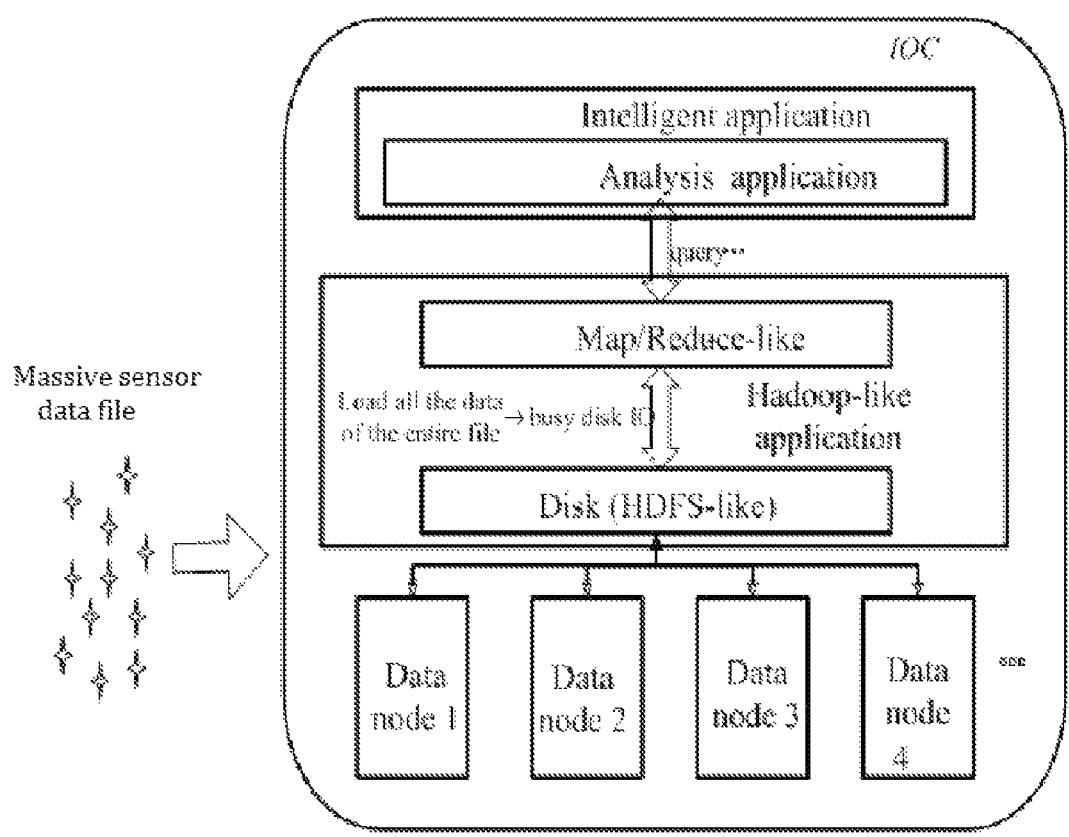
FIG. 2 shows a schematic diagram of an architecture of an Intelligent Operation Center in which the method and apparatus of the present invention may be implemented.

Referring to FIG. 2, a schematic diagram of an architecture of an Intelligent Operation Center for city, in which the method and apparatus of the present invention may be implemented, is shown. In FIG. 2, massive sensor data files from large amounts of sensors are stored into disks managed by a file system, such as Hadoop Distributed File System (HDFS), etc. The massive sensor data files from large amounts of sensors can be gathered into a uniform big file of the file system like HDFS, and the big file is stored in a disk managed by the file system. The disk may be only a logical concept, and the massive sensor data may actually be stored in disks on data nodes distributed in various areas. That is to say, from the viewpoint of the file system, it manages the uniform big file stored in the disk, while actually the big file is stored distributedly in disks on various data nodes. When an intelligent application such as an analysis application performs a query, the Hadoop-like application in the Intelligent Operation Center (IOC) will first load all the data of the entire uniform big file from the disk to the memory space of the working storage, thus bringing a heavy burden to the disk 10 and increasing the latency of a query response.

For a HDFS like file system, data organization is based on blocks and data loading is also based on blocks. For example, the size of each block is generally about 64M, while the size of each big file may be about 300 blocks, i.e., 64M×300=~20 G.

Figure 3:
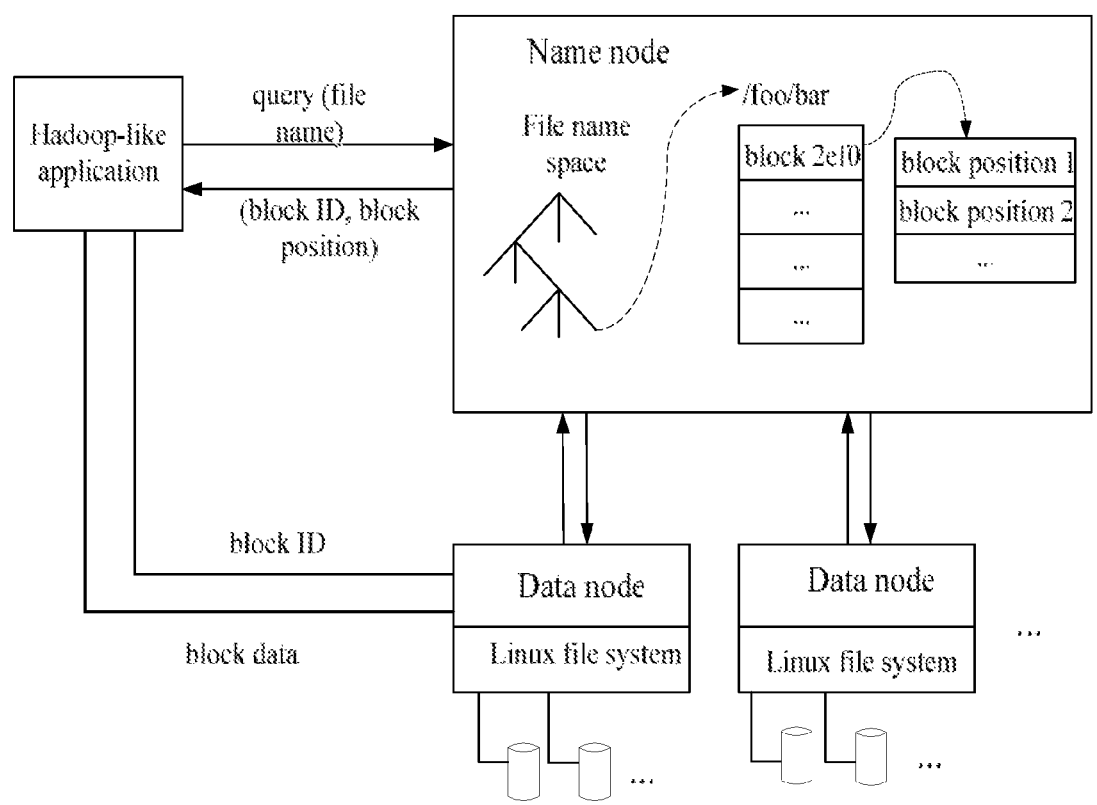
FIG. 3 shows in more detail a schematic diagram of a Hadoop-like architecture in which the method and apparatus of the present invention may be implemented and the operations thereof.

Referring to FIG. 3, a schematic diagram of a Hadoop-like architecture, in which the method and apparatus of the present invention may be implemented and the operations thereof, is shown in more detail. In FIG. 3, a Hadoop-like application is connected with a name node and a plurality of data nodes via a network. It also may be connected with one or more Hadoop-like clients (not shown) via a network. The Hadoop-like application may be located in the Intelligent Operation Center (IOC); of course, it may also be located in other application scenarios. The data nodes are usually distributed in different geographical locations, and may be managed by, e.g., a Linux file system. Data nodes are used for storing massive data, e.g., massive sensor data, in the disks connected thereto. Massive data are usually stored in data nodes in the form of blocks, and usually have a set storage redundancy. That is to say, data of the same file are usually stored in a plurality of blocks, and the plurality of blocks are distributed in different data nodes, and the data of the same block of the file are usually stored in a set number of data nodes. The mapping relationships between files, blocks and data nodes are maintained in the name node. As shown in FIG. 3, the name node stores the file name space of the Hadoop-like file system, a number of block IDs (e.g., block 2ef0) to which the file names (e.g./foo/bar) in the file name space correspond, and the block position of each block (e.g., block position 1, block position 2), i.e., the data node where the block resides.

During the process of reading a Hadoop-like file, as shown in FIG. 3, the Hadoop-like application usually, in response to a query request received from a client, sends the query request including a file name to the name node. The name node, according to the files name, looks up each block ID to which the file name corresponds as well as the block positions of each block, and return each block ID and each block positions thereof to the Hadoop-like application. Thereafter, with respect to each block, the Hadoop-like application selects the data node closet to the client in the block positions (i.e., data nodes) of the block, and sends a request for the block to the data node. Then, the data node returns the requested block to the client according to the request. In this way, the client may assemble each block of the file received from the respective data nodes into a whole file.

During the process of writing a Hadoop-like file (not shown), the Hadoop-like application usually, in response to a file writing request received from a client, sends the writing request including the file name to the name node, and applies for new blocks with the name node. The name node will assign new blocks for the file, and obtains a list of data nodes storing these blocks, the size of the list being dependent on the redundancy setting, and then returns each block identifier and the corresponding data node list to the Hadoop-like application. Then, the Hadoop-like application splits the file into a plurality of parts, and successively sends each part to the respective data nodes, so as to be stored by the data nodes into disks associated therewith.

Sensor data from different sensor devices has been found to natively cluster together in data files according to temporal and spatial attributes. After these data files are gathered into a uniform file, such clustering still remains. That is to say, data with the same temporal and spatial attributes are usually stored in the same data files, and are usually stored at adjacent positions in the uniform file, i.e., usually stored in the same one or few blocks (of course, the same one block may store data with different temporal and spatial attributes).

Figure 4:
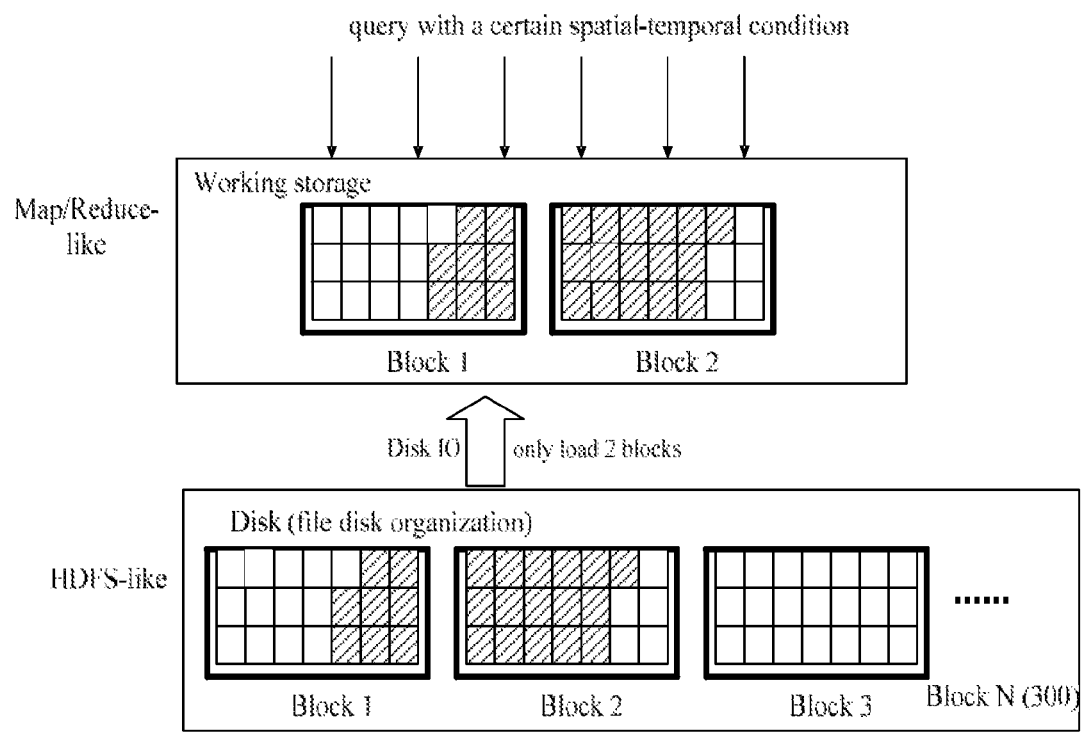
FIG. 4 schematically shows the basic ideas of the present invention.

Referring to FIG. 4, the basic idea of the present invention is schematically shown. In FIG. 4, a file is stored in the form of blocks in block 1, block 2, . . . block N, which are in the disks managed by HDFS-like file system (i.e., the disks in the data nodes). In the prior art, when a query is received, all the blocks of the file are loaded from the disk to the memory space of the working storage managed by Map/Reduce-like. However, the query includes a spatial and temporal condition, and the data satisfying the condition actually only exist in block 1 and block 2 (as shown by the shaded parts of block 1 and block 2 in the Figure). Therefore, only block 1 and block 2 need to be loaded into the memory space of the working storage. To this end, in the solution of the present invention, the mapping relationships between block identifiers and characteristics of sensor data, such as temporal and spatial attributes, will be created in advance and a query will be intercepted during the runtime so as to only load from the disk the blocks containing the sensor data corresponding to the parameters such as time and space in the query condition (as shown in block 1 and block 2 in the FIG. 4).

Figure 5:
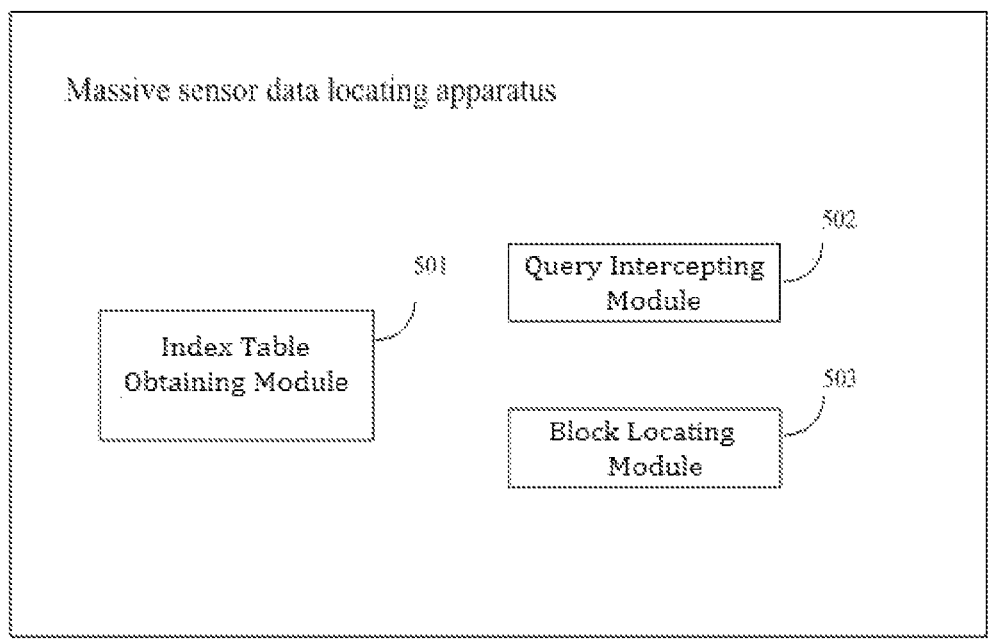
FIG. 5 shows a sensor data locating apparatus according to an embodiment of the present invention.

Referring to FIG. 5, a sensor data locating apparatus according to an embodiment of the present invention is shown. In FIG. 5, the apparatus comprises: an Index Table Obtaining Module 501 configured to obtain an index table including the mapping relationships between block identifiers of sensor data storage blocks and characteristic attributes of sensor data; a Query Intercepting Module 502 configured to, in response to a query to the sensor data in runtime, intercept the query and extract characteristic parameters in the query condition; and a Block Locating Module 503 configured to use the characteristic parameters to locate the block identifiers of matching sensor data storage blocks in the index table, so as to load the storage blocks indicated by the located block identifiers into the memory space of a working storage for response to the query.

According to an embodiment of the present invention, the characteristic attributes comprise either one or both of a temporal attribute and a spatial attribute, and the characteristic parameters correspondingly comprise either one or both of a temporal parameter and a spatial parameter. According to other embodiments of the present invention, the characteristic attributes may also comprise other data attributes than a temporal attribute and a spatial attribute, and the characteristic parameters may also correspondingly comprise other data characteristic parameters than a temporal parameter and a spatial parameter. Actually, the characteristic parameters may be any kind of data characteristic parameters that can be extracted from a query condition, and the characteristic attributes may be any corresponding kind of data characteristic attributes.

In an embodiment of the present invention, the sensor data are stored on data nodes managed by the Hadoop-like Distributed File System in the form of blocks. In an embodiment of the present invention, the sensor data are stored in a file of the Hadoop-like Distributed File System. This means that, the sensor files from a plurality of sensors are gathered to a file of the Hadoop-like Distributed File System. Of course, in some other embodiments of the present invention, the sensor data may also be stored on data nodes managed by other file systems, and the sensor data may also be saved in a file of the other file systems.

According to an embodiment of the present invention, the sensor data locating apparatus may further comprise an index table creating module for creating the above-mentioned index table. Of course, in some other embodiments of the present invention, the index table creating module may be external to the sensor data locating apparatus, that is, the apparatus does not comprise the index table creating module. In addition, in some other embodiments of the present invention, the index table creating module may be combined with the index table obtaining module 501 to be a single module.

According to an embodiment of the present invention, the index table creating module may, by scanning data in the blocks stored in the data nodes, create an index table including the mapping relationships between block identifiers and characteristic attributes of the sensor data stored in the blocks. According to another embodiment of the present invention, the index table creating module may record the mapping relationships between the characteristic attributes of the sensor data and the corresponding blocks assigned to the sensor data during the process of writing sensor data into data nodes managed by the Hadoop-like Distributed File System, so as to create and update the index table including the mapping relationships between the block identifiers of the sensor data storage blocks and the characteristic attributes of the sensor data. The index table creating module may create the index table after the sensor data files have been gathered to one file and at any time before beginning to receive and process a query.

According to an embodiment of the present invention, the index table creating module may store the created index table on the name node of the Hadoop-like architecture, or in any other places accessible to the name node.

The following table shows an example of an index table created by the index table creating module:

TABLE 1

Example Index Table

| Block identifier | space | Time | type | ... |
|---|---|---|---|---|
| 0021 | Xi'erqi China bank | 2011 Jan. 22 | ... | |
| 0021 | 4rd high school | 2011 Jan. 22 | ... | |
| ... | ... | ... | ... | |
| 12246 | intersection 1101 | 2011 May 15 | ... | |
| 12247 | intersection 1101 | 2011 May 15 | ... | |

The example index table, Table 1, contains the mapping relationship between the block identifier "00021" and the spatial attribute "4rd high school" and the temporal attribute "2011-01-22", which indicates that in block 00021 are stored sensor data with the spatial attribute and the temporal attribute.

After the application issues a query for the sensor data in a file in the disk, the query intercepting module 502 intercepts the query and extracts the characteristic parameters in the query condition. Thereafter, the block locating module 503 uses the extracted characteristic parameters to locate the corresponding block identifier in the index table, so as to load the block to the memory space of the working storage for response to the query. For example, an example query condition in the example query intercepted by the query intercepting module 502 is "location='4rd high school' and time=2011-01-22' and . . . ", and the example query condition includes the example spatial parameter "4rd high school" and the example temporal parameter "2011-01-22", thus the block locating module 503 may use the example spatial parameter and the example temporal parameter to locate the example block identifier 00021 in the above example index table, so as to load the block to the memory space of the working storage for response to the query.

According to an embodiment of the present invention, the index table further comprises the relationships between the block identifiers of the sensor data and other attributes of the sensor data. For example, the above example index table further comprises the mapping relationships between the block identifiers and the types of the sensor data. And in this case, after the query intercepting module 502 intercepts the query, it may extract the characteristic parameters and other corresponding parameters, e.g., type, in the query condition and then the block locating module 503 may use the extracted characteristic parameters and the other parameters to locate the corresponding block identifiers in the index table, so as to load the block to the memory space of the working storage.

According to an embodiment of the present invention, the sensor data locating apparatus is realized on the name node of a Hadoop-like architecture, so as to realize a seamless integration of the apparatus with the Hadoop-like architecture. This means that, the index table obtaining module 501, the query intercepting module 502, the block locating module 503 and the index table creating module are all on the name node of the Hadoop-like architecture, and the index table created by the index table creating module is also on the name node. Thus, the present invention only needs to change the name node in the existing Hadoop-like architecture, and does not need to change the remaining parts of the existing Hadoop-like architecture. Before a Hadoop-like application receives and processes a query from a client, the index table creating module of the present invention will first create an index table including the mapping relationships between the block identifiers and the characteristic attributes of sensor data stored in the blocks. When the Hadoop-like application receives a query from a client, as in the prior art, the Hadoop-like application sends the query to the name node. When the name node receives the query from the Hadoop-like application, the query intercepting module 502 of the present invention intercepts the query, and extracts the characteristic parameters about the sensor data in the query condition. Next, the block locating module 503 of the present invention uses the characteristic parameters to locate the corresponding block identifiers in the index table, and provides each located block identifier to the name node (i.e., a corresponding existing processing module therein). Then, as in the prior art, the name node obtains a set of block positions (i.e., data nodes) to which each block identifier corresponds, and returns each block identifier and the set of block positions corresponding thereto to the Hadoop-like application, so that the Hadoop application or its client may determine the proper data nodes according to the block positions, and loads the data in the blocks from the data nodes to the memory space of the working processor for response to the query. Thus it can be seen that in this way a seamless integration of the data locating apparatus of the present invention and the Hadoop-like architecture is realized, which facilitates the implementation of apparatus of the present invention.

In other embodiments of the present invention, the sensor data locating apparatus may also be realized outside the name node, and cooperate with the Hadoop-like architecture in other ways, so as to realize the objectives of the present invention.

According to some embodiments of the present invention, the apparatus further comprises a query execution module configured to execute a query against the blocks loaded into the memory space of the working storage and return the query result. The query execution module may be a query processing module in the existing Hadoop-like architecture or in other architectures. Of course, in some other embodiments of the present invention, the apparatus may also not include the query execution module.

The sensor data locating apparatus is described above according to the embodiments of the present invention and by referring to the accompanying drawings. It should be pointed out that the apparatus is only exemplary, rather than limitation to the present invention. In other embodiments of the present invention, the apparatus may comprise more, less or different modules, and the relationships of connection, containment, function, etc. among the modules may be different from described or illustrated. For example, it may also be contemplated to include the index table into the apparatus; still for example, the modules may be split and combined in any manners, as long as the functions executed by these modules are maintained.

Figure 6:
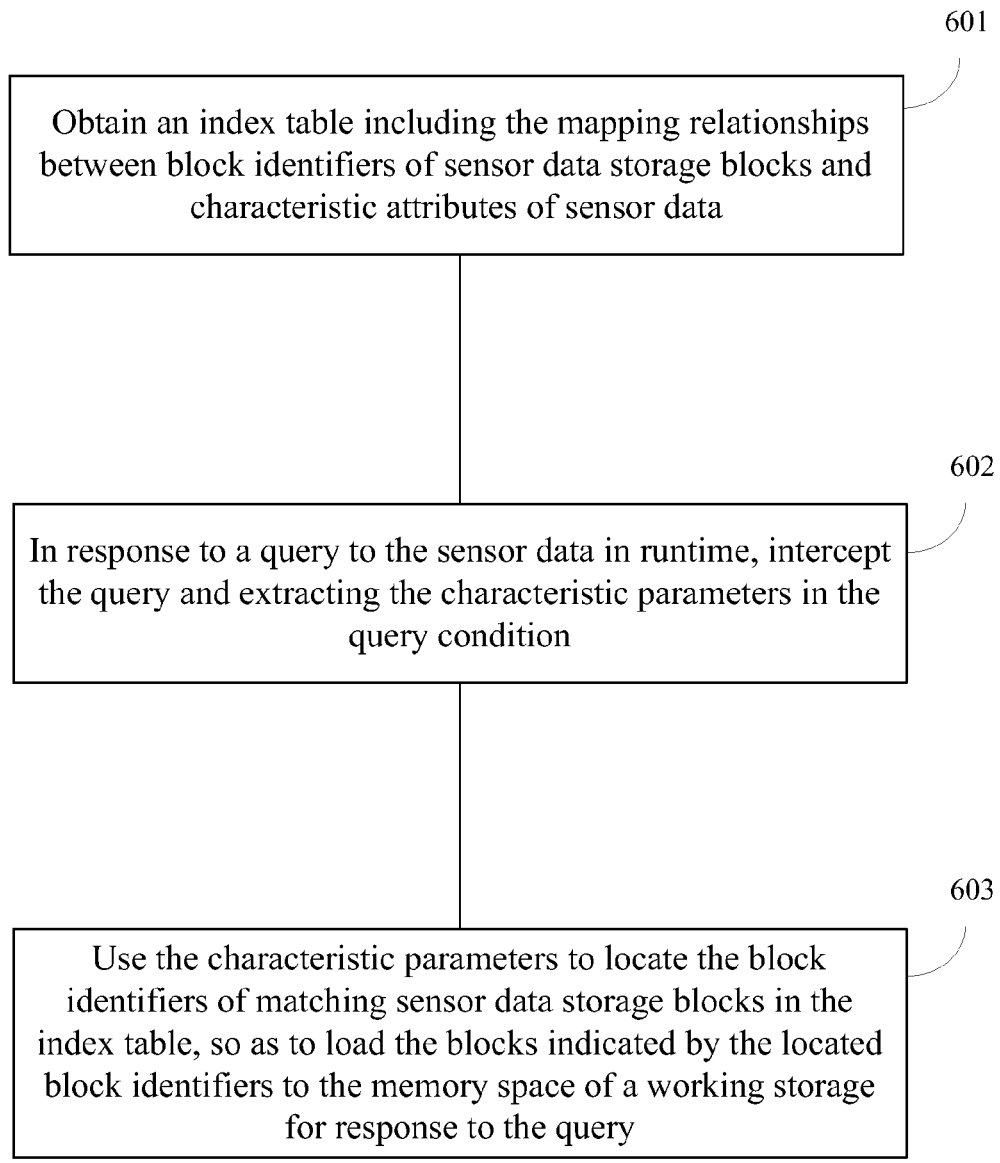
FIG. 6 shows a sensor data locating method according to an embodiment of the present invention.

Referring to FIG. 6, a sensor data locating method according to an embodiment of the present invention is shown. The method comprises steps 601, 602, and 603 as shown in FIG. 6.

At step 601, obtain an index table including the mapping relationships between block identifiers of sensor data storage blocks and characteristic attributes of sensor data.

At step 602, in response to a query to the sensor data in runtime, intercept the query and extract the characteristic parameters in the query condition.

At step 603, use the characteristic parameters to locate the block identifiers of matching sensor data storage block in the index table, so as to load the storage blocks indicated by the located block identifiers to the memory space of a working storage for response to the query.

According to an embodiment of the present invention, the characteristic attributes includes either one or both of a temporal attribute and a spatial attribute, and the characteristic parameters correspondingly includes either one or both of a temporal parameter and a spatial parameter.

According to an embodiment of the present invention, the sensor data are stored on data nodes managed by a Hadoop-like Distributed File System in the form of blocks.

According to an embodiment of the present invention, the sensor data are stored in a file of the Hadoop-like Distributed File System.

According to an embodiment of the present invention, the method further comprises a step of creating the index table.

According to an embodiment of the present invention, creating the index table is realized by scanning the data stored in blocks on data nodes managed by the Hadoop-like Distributed File System.

According to the embodiments of the present invention, creating the index table is realized in the process of writing sensor data into data nodes managed by the Hadoop-like Distributed File System.

According to an embodiment of the present invention, the index table is stored in the name node in the Hadoop architecture.

According to an embodiment of the present invention, the index table further comprises the relationship between the block identifiers of the sensor data storage blocks and other attributes of the sensor data.

According to an embodiment of the present invention, the method is realized on the name node of the Hadoop-like architecture, so as to realize a seamless integration of the method and the Hadoop-like architecture.

According to an embodiment of the present invention, the method further comprises the following steps: execute the query against the blocks loaded into the memory space of the working storage and return the query result.

The sensor data locating method is described above according to embodiments of the present invention and by referring to the accompanying drawings. It should be pointed out that the method may include more, less or different steps, and the relationships of connection, inclusion, function, etc. among the steps may be different from described or illustrated. For example, the steps may be split or combined in any manners, as long as the operations executed in these steps are maintained.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for locating a sensor data stored in a distributed data system, comprising the steps of:
   obtaining an index table for the distributed data system;
   intercepting a query for sensor data in runtime;
   extracting a characteristic parameter from a condition of the query, wherein the characteristic parameter includes at least one of a temporal parameter and a spatial parameter of the sensor data;
   locating, in the index table, a block identifier of one or more storage blocks of the distributed data system that include sensor data corresponding to the characteristic parameter, wherein the block identifier identifies a location of the one or more storage blocks in the distributed data system; and
   loading only the one or more storage blocks of the distributed data system into a memory space of a working processor that correspond to the block identifier;
   wherein said index table contains mapping relationships between block identifiers of storage blocks of the distributed data system and characteristic attributes of the sensor data, wherein the characteristic attributes of the sensor data includes at least one of a temporal parameter and a spatial parameter of the sensor data and wherein the index table is created prior to intercepting the query.

2. The method of claim 1, further comprising the step of creating said index table.

3. The method of claim 2, wherein creating said index table is realized by scanning data stored in storage blocks on data nodes managed by a Hadoop-like Distributed File System.

4. The method of claim 2, wherein creating said index table is realized during a process of writing sensor data into data nodes managed by a Hadoop-like Distributed File System.

5. The method of claim 1, wherein said index table further contains relationships between said block identifiers of sensor data storage blocks and other attributes of sensor data.

6. The method of claim 1, wherein the method is realized on a name node of a Hadoop-like architecture, so as to realize seamless integration of the method and said Hadoop-like architecture.

7. An system for locating a sensor data stored in a distributed data system, the system comprising a processor configured to:
   obtain an index table for the distributed data system;
   intercept a query for sensor data in runtime, and extract a characteristic parameter from a condition of the query, wherein the characteristic parameter includes at least one of a temporal parameter and a spatial parameter of the sensor data; and
   locate, in the index table, a block identifier of one or more storage blocks of the distributed data system that include sensor data corresponding to the characteristic parameter wherein the block identifier identifies a location of the one or more storage blocks in the distributed data system, and
   load only the one or more storage blocks into a memory space of a working processor that correspond to the block identifier;
   wherein said index table contains mapping relationships between block identifiers of storage blocks of the distributed data system and characteristic attributes of the sensor data, wherein the characteristic attributes of the sensor data includes at least one of a temporal parameter and a spatial parameter of the sensor data and wherein the index table is created prior to intercepting the query.

8. The apparatus of claim 7, wherein the processor is configured to create said index table.

9. The apparatus of claim 8, wherein the processor is further configured to create said index table by scanning data stored in storage blocks on data nodes managed by a Hadoop-like Distributed File System.

10. The apparatus of claim 8, wherein the processor is further configured to create said index table during a process of writing sensor data into data nodes managed by a Hadoop-like Distributed File System.

11. The apparatus of claim 7, wherein said index table further contains relationships between a block identifier of sensor data storage blocks and other attributes of sensor data.

12. The apparatus of claim 7, wherein the apparatus is realized on a name node of a Hadoop-like architecture, so as to realize a seamless integration of the apparatus and said Hadoop-like architecture.

13. A system for locating a sensor data in a distributed data system, comprising:
   a memory;
   a processor device communicatively coupled to said memory;
   a sensor data locating module communicatively coupled to said memory and said processor device, wherein said sensor data locating module is configured to perform steps of a method comprising:
   obtaining an index table for the distributed data system;
   intercepting a query for sensor data in runtime;
   extracting a characteristic parameter from a condition of the query, wherein the characteristic parameter includes at least one of a temporal parameter and a spatial parameter of the sensor data;
   locating, in the index table, a block identifier of one or more storage blocks of the distributed data system that include sensor data corresponding to the characteristic parameter wherein the block identifier identifies a location of the one or more storage blocks in the distributed data system; and
   loading only the one or more storage blocks into said memory that correspond to the block identifier;
   wherein said index table contains mapping relationships between block identifiers of storage blocks f the distributed data system and characteristic attributes of the sensor data, wherein the characteristic attributes of the sensor data includes at least one of a temporal parameter and a spatial parameter of the sensor data and wherein the index table is created prior to intercepting the query.

14. The system of claim 13, wherein said index table further contains relationships between a block identifier of sensor data storage blocks and other attributes of sensor data.

15. The system of claim 13, wherein said sensor data locating module is further configured to also perform the step of creating an index table.

16. The system of claim 15, wherein said sensor data locating module is further configured to create said index table by scanning data stored in storage blocks on data nodes managed by a Hadoop-like Distributed File System.

17. The system of claim 15, wherein said sensor data locating module is further configured to create said index table during a process of writing sensor data into data nodes managed by a Hadoop-like Distributed File System.

* * * * *